(12) United States Patent
Heinla et al.

(10) Patent No.: US 8,009,572 B2
(45) Date of Patent: Aug. 30, 2011

(54) PEER-TO-PEER TELEPHONE SYSTEM

(75) Inventors: Ahti Heinla, Tallinn (EE); Priit Kasesalu, Tallinn (EE)

(73) Assignee: Skype Limited, Dublin (IE)

( * ) Notice: Subject to any disclaimer, the term of this patent is extended or adjusted under 35 U.S.C. 154(b) by 758 days.

(21) Appl. No.: 10/890,160

(22) Filed: Jul. 14, 2004

(65) Prior Publication Data

US 2005/0122965 A1    Jun. 9, 2005

(51) Int. Cl.
*G01R 31/08* (2006.01)

(52) U.S. Cl. .......................................... 370/252; 726/10

(58) Field of Classification Search ............... 370/375, 370/356, 238, 401, 352, 252; 379/113, 114; 709/205, 228
See application file for complete search history.

(56) References Cited

U.S. PATENT DOCUMENTS

| | | | |
|---|---|---|---|
| 6,061,794 | A | 5/2000 | Angelo et al. |
| 6,426,955 | B1 * | 7/2002 | Dalton et al. ................. 370/401 |
| 6,850,252 | B1 * | 2/2005 | Hoffberg ...................... 715/716 |
| 6,996,093 | B2 * | 2/2006 | Dalton et al. ................. 370/356 |
| 7,133,846 | B1 * | 11/2006 | Ginter et al. ..................... 705/54 |
| 7,269,256 | B2 * | 9/2007 | Rosen ............................. 380/44 |
| 7,480,257 | B2 | 1/2009 | Sakano et al. |
| 2002/0152271 | A1 * | 10/2002 | Chafle et al. ................... 709/204 |
| 2002/0184311 | A1 | 12/2002 | Traversat et al. |
| 2003/0065749 | A1 * | 4/2003 | Gailey et al. ................... 709/219 |
| 2003/0095546 | A1 * | 5/2003 | Sakano et al. ................. 370/352 |
| 2003/0163697 | A1 * | 8/2003 | Pabla et al. .................... 713/171 |
| 2003/0217158 | A1 * | 11/2003 | Datta ............................. 709/228 |
| 2005/0086300 | A1 * | 4/2005 | Yeager et al. .................. 709/204 |
| 2010/0177770 | A1 | 7/2010 | Heinla et al. |

FOREIGN PATENT DOCUMENTS

| | | |
|---|---|---|
| ES | 2192942 | 10/2003 |
| JP | 2000354031 A | 12/2000 |
| JP | 2003158553 A | 5/2003 |
| WO | WO 01/13201 A2 | 2/2001 |
| WO | WO 03/014955 A1 | 2/2003 |
| WO | WO 03/079635 A1 | 9/2003 |

OTHER PUBLICATIONS

Charas, P., "Peer-to-Peer Mobile Network Architecture," *Peer-to-Peer Computing 2001 IEEE Computing Soc. US*, pp. 55-61.
Chathapuram, "Security in Peer-to-Peer Networks," *Peer-to-Peer Computing*, Aug. 8, 2001.
International Search Report from International Application No. PCT/IB2004/002282, mailed on Mar. 17, 2005.
Japanese Application No. 2006-520034, Office Action dated Jun. 8, 2010. Ichikawa, Y., "How to use PC as Video Phone," *Nikkei Personal Computing 417*:120-127 (2002).
Koyama, A., "Exhaustive Guide to Use Internet," *Mac People Beginners 8*:138-143 (2001).
Chinese Application No. 200480020437.6, Office Action dated Jan. 23, 2009.
Chinese reference entitled, "Telecommunication Security and Its Realization in Blue Teeth Network," by Yan Dezheng, Zhejiang University, dated Dec. 31, 2001.

\* cited by examiner

*Primary Examiner* — Ricky Ngo
*Assistant Examiner* — David Oveissi
(74) *Attorney, Agent, or Firm* — Hamilton, Brook, Smith & Reynolds, P.C.

(57) ABSTRACT

There is provided a peer-to-peer telephone system comprising a plurality of end-users and a communication structure through which one or more end-users are couplable for communication purposes. The system is distinguished in that the communication structure is substantially de-centralized with regard to communication route switching therein for connecting the one or more end-users. One or more end-users are operable to establish their own communication routes through the structure based on exchange of one or more authorization certificates, namely User Identity Certificates (UIC), to acquire access to the structure. The structure comprises an administration arrangement for issuing said one or more certificates to said one or more end-users.

38 Claims, 2 Drawing Sheets

PEER-TO-PEER TELEPHONE SYSTEM

FIELD OF THE INVENTION

The present invention relates to telecommunications systems, for example to telephone systems as well as to decentralized telecommunications systems operating according to a peer-to-peer principle. Moreover, the invention also relates to methods of operating such telephone systems and telecommunications systems.

BACKGROUND TO THE INVENTION

Contemporary telecommunications systems presently deployed, for example "public switched telephony network" (PSTN), mobile telephone and "Voice over Internet protocol" (VoIP), are substantially centralized in nature. They often employ central exchanges linked to users through trunk lines, local metro-rings and similar distribution structures. More recently, software-operated end-user devices have become available for connecting to such contemporary telephone systems, for example desk telephones, mobile telephones and VoIP devices. However, for performing almost any function offered by the telephony service provider, end-user devices are obliged to communicate with a central telephone exchange and/or branch exchange which executes one or more desired functions for them. In most cases, two end-user telephones of such a contemporary telephone system are not able to communicate directly to one another without a central exchange of the system linking the two end-user telephones together. For example, two people using their mobile telephones to converse together is facilitated by their two telephones communicating by radio via one or more mobile base stations, such base station communication being required even when the two people and their associated mobile telephones are in the same building. In another example, two people using "Voice over IP" software to converse together over the public Internet is facilitated by their software applications communicating via a central server, such server being required even though a connection can be established directly between the two people.

The use of centralized telephone systems places considerable demands on central switching exchanges. Such central exchanges are increasingly dependent on wide bandwidth optical connections employing dense wavelength division multiplexing (DWDM) with up to 120 optical channels distributed into wavelength bands of 50 GHz frequency spacing at an optical carrier frequency in the order of 300 THz. Such centralized exchanges are extremely costly and complex items of equipment which are susceptible to occasional malfunction, such malfunction potentially resulting in loss of communication traffic therethrough with potential corresponding compensation payments due to customers. Moreover, the cost of operating such central exchanges scales proportionally with the number of end users.

The inventors of the present invention have appreciated that such a centralized approach is sub-optimal in many situations and that advantages arise from the deployment of other alternative telephone system architectures.

In order to address issues arising from adoption of such alternative architectures, the inventors have devised the present invention.

SUMMARY OF THE INVENTION

A first object of the invention is to provide a substantially decentralized telephone network system.

A second object of the invention is to provide such a decentralized telephone system in which subscriber authentication, network access control and accounting are performable in a more robust and reliable manner.

A third object of the invention is to provide a decentralised telephone system operable to reduce concentration of communication traffic therein by transferring responsible for establishing connections to end-users of the system.

According to a first aspect of the present invention, there is provided a peer-to-peer telephone system comprising a plurality of end-users and a communication structure through which one or more end-users are couplable for communication purposes, characterised in that:

(a) the communication structure is substantially de-centralized with regard to communication route switching therein for connecting said one or more end-users;
(b) said one or more end-users are operable to establish their own communication routes through the structure based on verification of one or more authorisation certificates to acquire access to the structure; and
(c) said structure includes administrating means for issuing said one or more certificates to said one or more end-users.

The invention is of advantage in that it is capable of addressing at least one of the aforementioned objects of the invention.

The invention is capable of addressing issues associated with less-centralized architectures, namely issues of control and user-authorisation, for example for billing/invoicing purposes to which the present invention is directed.

Preferably, in the system, the administrating means is operable to administer at least one of end-user sign-up and end-user payment for access to the communication structure.

More preferably, for example to try to circumvent unauthorised free and/or fraudulent use of the system, the administrating means is operable to generate one or more private-public key pairs, the administrating means being operable to maintain said one or more private keys secret and to distribute said one or more corresponding public keys within the system for certificate authentication purposes. Yet more preferably in the system, the administrating means is operable to generate private-public key pairs using a Rivest-Shamir-Adelman (RSA) method.

Preferably, for purposes of enhancing network robustness in the system, the structure includes a peer-to-peer communication network through which the end-users are mutually connectable. More preferably, the peer-to-peer network is implemented as a combination of interfacing nodes and storage nodes, said storage nodes being configured in one or more slots for database access purposes. Beneficially, the structure is implemented by way of a proprietary Global Index peer-to-peer network technology.

Preferably, in the system, the administrating means is arranged to perform one or more of:

(a) providing an end-user accounts database;
(b) providing a synchronizing time reference for the communication structure;
(c) providing globally-configurable settings for the system;
(d) providing peer discovery during bootstrap of the structure;
(e) handling new end-user registration; and
(f) monitoring operation of the structure for controlling desired modes of operation thereof.

Preferably, in the system, a plurality of end-users are operable to mutually exchange their authorisation certificates prior to commencing communication therebetween where at least one of said certificates is identified to be authentic.

Preferably, for example to assist adoption of the system in practice, the structure is arranged to support end-user free-trial use of the system, such free-trial use being subject to administration from the administrating means by repeated issuing of authorisations.

Preferably, the administrating means is operable to invoice one or more end-users on a flat-fee rate substantially irrespective of use of the system exercised by said one or more end-users.

Preferably, in order to promote usage of the system in existing deployed equipment, the system is arranged to be configurable to operate concurrently with POTS and/or PSTN. Abbreviations POTS and PSTN correspond to "Plain Old Telephone System" and "Public Switch Telephone Network" respectively.

Preferably, the administrating means is implemented by way of one or more central computer servers. Such an implementation is especially beneficial when the system is configured in conjunction with the public Internet. Alternatively, the administrating means is otherwise susceptible to being implemented in a substantially de-centralized manner.

Preferably, the administrating means is operable to apply an heuristics fraud detection analysis of end-user registration and system usage data for detecting fraudulent access to the system by end-users.

According to a second aspect of the present invention, there is provided a method of operating a peer-to-peer telephone system comprising a plurality of end-users and a communication structure through which one or more end-users are couplable for communication purposes, characterised in that the method includes steps of:

(a) arranging for the communication structure to be substantially de-centralised with regard to communication route switching therein for connecting said one or more end-users;

(b) arranging for said one or more end-users to be operable to establish their own communication routes through the structure based on verification of one or more authorisation certificates to acquire access to the structure; and (c) arranging for said structure to include administrating means for issuing said one or more certificates to said one or more end-users.

The method is of advantage in that its application to the system is capable of addressing at least one of the objects of the invention.

Preferably, in the method, the administrating means is operable to administer at least one of end-user sign-up and end-user payment for access to the communication structure.

Preferably, in the method, the administrating means is operable to generate one or more private-public key pairs, the administrating means being operable to maintain said one or more private keys secret and to distribute said one or more corresponding public keys within the system for certificate authentication purposes.

Preferably, in the method, the administrating means is operable to generate private-public key pairs using a Rivest-Shamir-Adelman (RSA) method. However, other approaches to private-public key generation are also susceptible to being used in the method.

Preferably, in the method, the structure includes a peer-to-peer communication network through which the end-users are mutually connectable. More preferably, the peer-to-peer network is implemented as a combination of interfacing nodes and storage nodes, said storage nodes being configured in one or more slots for database access purposes.

Preferably, in the method, the administrating means is arranged to perform one or more of:
(a) providing an end-user accounts database;
(b) providing a synchronizing time reference for the communication structure;
(c) providing globally-configurable settings for the system;
(d) providing peer discovery during bootstrap of the structure;
(e) handling new end-user registration; and
(f) monitoring operation of the structure for controlling desired modes of operation thereof.

Preferably, in the method, a plurality of end-users are operable to mutually exchange their authorisation certificates prior to commencing communication therebetween where at least one of said certificates is identified to be authentic.

Preferably, to encourage adoption of the system, the method is implemented such that the structure is arranged to support end-user free-trial use of the system, such free-trial use being subject to administration from the administrating means by repeated issuing of authorisations.

Preferably, in the method, the administrating means is operable to invoice one or more end-users on a flat-fee rate substantially irrespective of use of the system exercised by said one or more end-users.

Preferably, in order to encourage use of the system where existing telephone infrastructure exists, the method is implemented such that the system is arranged to be configurable to operate concurrently with POTS and/or PSTN. Abbreviations POTS and PSTN correspond to "Plain Old Telephone System" and "Public Switched Telephone Network" respectively.

Preferably, in the method, the administrating means is implemented by way of one or more central computer servers.

Preferably, in order to avoid fraudulent use of the system when implementing the method, the administrating means is operable to apply an heuristics fraud detection analysis of end-user registration and system usage data for detecting fraudulent access to the system by end-users.

According to a third aspect of the present invention, there is provided software operable to implement at least part of the telephone system according to the first aspect of the invention.

According to a fourth aspect of the invention, there is provided software operable to execute at least part of the method according to the second aspect of the invention.

It will be appreciated that features of the invention are susceptible to being combined in any combination without departing from the scope of the invention.

DIAGRAMS OF EMBODIMENTS OF THE INVENTION

Embodiments of the invention will now be described, by way of example only, with reference to the following diagrams wherein.

DESCRIPTION OF EMBODIMENTS OF THE INVENTION

A telephone system according to the present invention is substantially a decentralised structure comprising a spatially distributed array of end-users connected by way of a peer-to-peer communication network. The structure is substantially devoid of any form of centralized exchange except for one or more administration nodes for performing some specific network administration functions such as subscriber sign-up and payment for communication network usage. In the decentralised structure, most routine functions, for example placing a telephone call, are handled entirely by end-user devices operable to communicate substantially directly to each other or via some form of local exchange such as an optical metro ring or distributed relay nodes on the public Internet.

In a system according to the present invention, the system indicated generally by 10 in FIG. 1, a first end-user (FEU) 20 of the system 10 desiring to send a message to a second end-user (SEU) 30 thereof adopts a method of communication as follows:

(a) the first end-user 20 locates the second end-user 30; such location is executed by way of peer-to-peer technologies, for example using a "Global Index" (GI) proprietary peer-to-peer technology which will be described later and/or contemporary "Distributed Hash Table" technology, arranged to provide node look-up functionality;

(b) the first end-user 20 receives information regarding the address of the second end-user 30 and also details of one or more communication path-ways 50, 60 which may be used for making a connection from the first end-user 20 to the second end-user 30; and (c) the first end-user 10 then follows a protocol to establish the one or more communication pathways 50, 60 to the second end-user 30.

In the GI peer-to-peer technology, there is provided a network of participating nodes interlinked through a distributed communication network. The participating nodes are allocated to be either interfacing nodes or storage nodes. Preferably, the number of storage nodes is arranged to be considerably less than the number of interfacing nodes, for example 100 times more interfacing nodes than storage nodes. Moreover, the storage nodes are responsible for storing data records whereas the interfacing nodes are responsible for processing queries and sending requests to the storage nodes for sending data records therefrom in response to the queries. Moreover, the interfacing nodes are also responsible for receiving data records to be stored and determining one or more appropriate groups of storage nodes to receive the data records for storage therein. The storage nodes are arranged in groups known as slots wherein association of a given storage node with a particular slot is dependent upon address data held in each of the storage nodes. The GI technology is described in a patent application approximately contemporary with the present patent application, the contents of the GI technology patent application herewith being incorporated by reference for purposes of describing the telephone system of the present invention.

In the system 10, there is a considerable requirement for subscriber authentication, access control and accounting. Using major system functions of the system 10 is only possible if one or more end-users thereof have paid or otherwise have authorized access to such functions. In a contemporary conventional telephone system, end-user access to one or more major system functions is checked by a central office thereof in a manner of centralised control. In contradistinction, in the system 10, access is checked by end-user devices using public-key cryptography. In such cryptography, each end-user, also referred to as subscriber, has associated therewith a cryptography key pair which is created by the end-user's device. Upon subscriber sign-up or payment, a central office of the system 10 issues to the subscriber a digital certificate, such certificate also being referred to as a User Identity Certificate (UIC), whereby the central office certifies that the owner of this key pair is an authorised subscriber.

In step (c) of the aforementioned method, when the first end-user 20 communicates with other subscriber devices, namely the second end-user 30, the first end-user 20 provides the certificate, namely the aforementioned UIC, as a proof of subscription. In the system 10, end-user devices are arranged to refuse to mutually communicate where there exists an absence of such proof of subscription. Moreover, using public-key cryptography, end-user devices of the system 10 are arranged to be operable to verify each other's certificates (UIC's) without needing to communicate with the aforesaid central office of the system 10 responsible for issuing certificates (UIC's). The system 10 thus functions in a de-centralized manner on account of the end-users 20, 30 not needing to communicate with the central office of the system 10 when establishing a communication route between the end-users 20, 30.

When a subscribing device of the system, for example the first end-user 20, has located a recipient, for example the second end-user 30, they will subsequent need to mutually communicate. Such communication is preferably by a direct route, for example along the path-way 60 illustrated in FIG. 1. However, for example for reasons of spatial separation and/or terrain, such a direct route is not always technically feasible; for example, if communication is desired from the first end-user 20 to the second end-user 30 via the public Internet, such communication is not feasible when the second end-user 30 has a private address that is not accessible from outside a local network of the system 10. In a situation where direct communication is not feasible, the system 10 is operable to route communication via one or more peer nodes in its peer-to-peer structure 80 to assist the first and second end-users 20, 30 to mutually communicate. These one or more peer nodes are preferably implemented by subscriber devices that need not necessarily belong to the first and second end-users 20, 30 involved in making a telephone call therebetween. Thus, for example, in such a scenario where direct connection is not feasible, a subscriber communicates to another device that is directly accessible, and this other device communicates directly with the final recipient.

Figure 2:
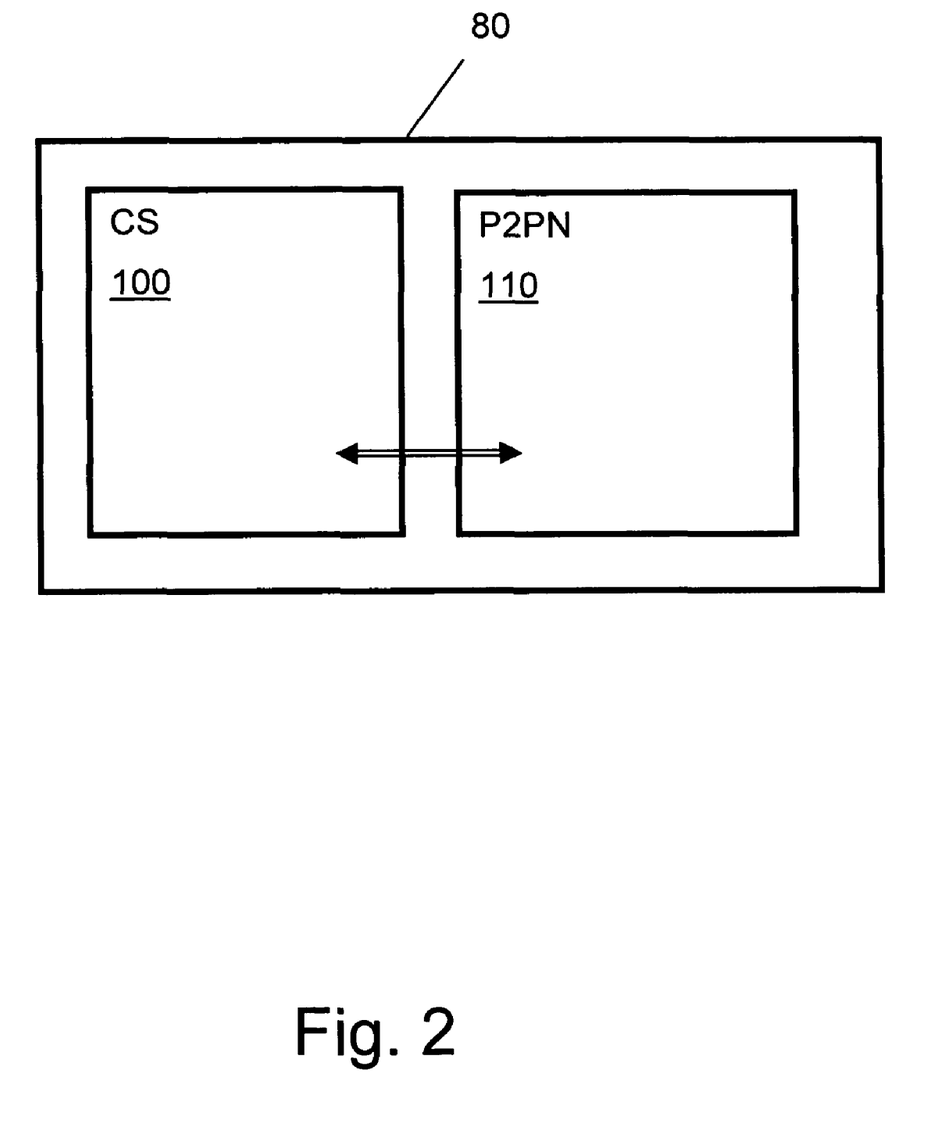
FIG. 2 is a schematic representation of a per-to-peer structure of the system of FIG. 1.

Architectural aspects of the system 10 will now be described in further detail. The peer-to-peer structure 80 is subdivided into two sections as illustrated in FIG. 2, namely central servers (CS) 100 on the one hand and a peer-to-peer network (P2PN) 110 on the other hand.

The central servers 100 are preferably operated by the proprietor of the structure 80. These servers 100 are arranged to execute one or more of the following tasks:

(i) providing an end-user accounts database for recording end-users' accounting details;

(ii) providing a synchronizing time reference for the structure 80;

(iii) providing globally-configurable settings for the system 10;

(iv) providing peer discovery during bootstrap of the structure 80 and handling new end-user registration;

(v) electronically signing critical information pertinent to the system 10, for example signing end-user identities as described in the foregoing, for example the aforementioned User Identity Certificates (UIC's), using digital signatures using secret cryptographic keys known only to the proprietor of the system 10;

(vi) providing add-on services from one or more of the proprietor's infrastructure, rented infrastructure and outsourced infrastructure; and (vii) monitoring operation of the central servers 100 and the network 110 for ensuring desired modes of operation thereof.

The add-on services referred in (vi) above relate to one or more of:
(1) "Public Switched Telephone Network" (PSTN) and/or "plain old telephone system" (POTS) connectivity, to "Voice over Internet Protocol" (VoIP) traffic termination and reverse thereof, for example from POTS to the proprietor's system 10;
(2) handling "Instant Message" (IM) to "Short Message Service" (SMS) connectivity; and
(3) handling end-user conferencing, voicemail and similar activities couplable to back-end servers included within the central servers 100.

The peer-to-peer network 110 preferably comprises end-user computing devices arranged to execute thereon software provided by the proprietor of the system 10. The network 110 is also preferably based on a version of the aforementioned GI protocol customized by the proprietor of the system 10. The network 110 is operable to perform functions preferably including one or more of:
(a) administering end-user buddy lists;
(b) handling end-user preferences, for example buddy online/offline notification;
(c) providing end-user identification by way of one or more of the following: node identification (ID), username, end-user profile data;
(d) maintaining basic statistics, for example a number of end-users currently actively communicating within the system 10; and
(e) maintaining firewall and/or "Network Address Translation" (NAT) traversal via random peer nodes within the network 110 functioning as ad hoc proxies supporting communication therethrough.

In (c) above pertaining to the peer-to-peer network 110, the username is effectively useable as a "telephone number" within the system 10. Moreover, the end-user profile data relates to data records if provided by the end-users, such records including one or more of: real name (e.g. Roger Smith, Annie Hansen), spatial location (e.g. Washington USA; Copenhagen, Denmark), date of birth and e-mail address.

The inventors have appreciated that operation of the system 10 is dependent on security provided by, for example, the use of public key encryption therein. In devising the system 10, the inventors have further anticipated that a peer-to-peer IM/VoIP system is inherently less secure than POTS or any comparable telephone system reliant on one or more central servers; as in the foregoing, abbreviations IM, VoIP and POTS refer to "Instant Messaging", "Voice over Internet Protocol" and "Plain Old Telephone System" respectively. In the system 10, the inventors have arranged for the use of contemporary Rivest-Shamir-Adelman (RSA) public key encryption and associated digital signatures to cater for most basic security requirements within the system 10. However, it will be appreciated that other types of public-private key encryption are susceptible to being employed in the system 10.

Upon an end-user, for example one of the end-users 20, 30, seeking registration at the central servers 100, the end-user proceeds to generate a RSA encryption key pair, namely complementary private and public keys wherein said private key is not derivable from said public key and vice versa. The end-user's public key appears in the User Identity Certificate (UIC) provided to the end-user, whereas the private key is stored locally at the end-users premises.

During a call set-up from the first end-user 20 to the second end-user 30, similarly during an Instant Message (IM) sending, prior to commencing communication, both end-users 20, 30 present their User Identity Certificate (UIC), or Temporary Identification Number (TIN) where the system 10 is set up to accept these, as appropriate to the other; if they have a user name, they present their UIC. If a UIC is presented from a primary one of the end-users 20, 30 to a secondary one thereof, the secondary end-user verifies the signature provided by the primary end-user, such verification not requiring any contact with the central servers 100. Moreover, the secondary end-user verifies that the primary end-user has the corresponding secret key by issuing a challenge data packet for the primary end-user's public key and checks that the primary end-user is capable of decrypting it. After completion of such activities, the primary end-user is in a position to safely believe that the primary end-user legitimately has the username it claims to hold.

When calls are made within the system 10, additional checking is required because calls require payment unless permission for a limited trial period has been granted. In the system 10, it is difficult to monitor in a secure manner duration of calls or number of calls made; in this respect, the inventors have appreciated that it is advantageous to employ a time-based subscription as a basis of billing/invoicing within the system 10. Thus, in order to implement such time-based subscription, User Identity Certificate (UIC) privileges are checked and non-trial calls are not communicated through the peer-to-peer network 110 if neither of the end-users 20, 30 in the above example has a User Identity Certificate (UIC) with non-expired subscription privileges. In other words, a call will propagate through the peer-to-peer network 110 if one or more of the end-users 20, 30 has a valid subscription or trial.

To keep their subscriptions from expiring, end-users of the system 10 are obliged to renew their User Identity Certificate (UIC) periodically for instance by paying a fee for a coming month/year; it will be appreciated that other payment periods are possible or that UICs may be extended based on other criteria than payment. Upon receipt of renewal payments, the central servers 100 are operable to issue new UIC's in response in the earlier end-users' names, the new UIC's having associated new subscription privilege expiry details. When credit/debit card billing/invoicing has been authorised by one or more of the end-users of the system 10, billing/invoicing is susceptible to being performed automatically by the central servers 100 without the need for associated end-user intervention.

Thus, in the system 10, a preferred method of payment for calls made is by flat-fee monthly or yearly subscription entitling the user to an unlimited number of calls in the system 10. Such a billing/invoicing arrangement is acceptable in the system 10 from a business perspective because calls made do not incur operating expenses to the proprietor of the system 10 as central exchange resources are substantially not utilized when making such calls. In contradistinction, calls to or from POTS/PSTN incur real per-minute operating costs and are therefore appropriately charged separately and distinctly from calls made according to the invention in the system 10.

Figure 1:
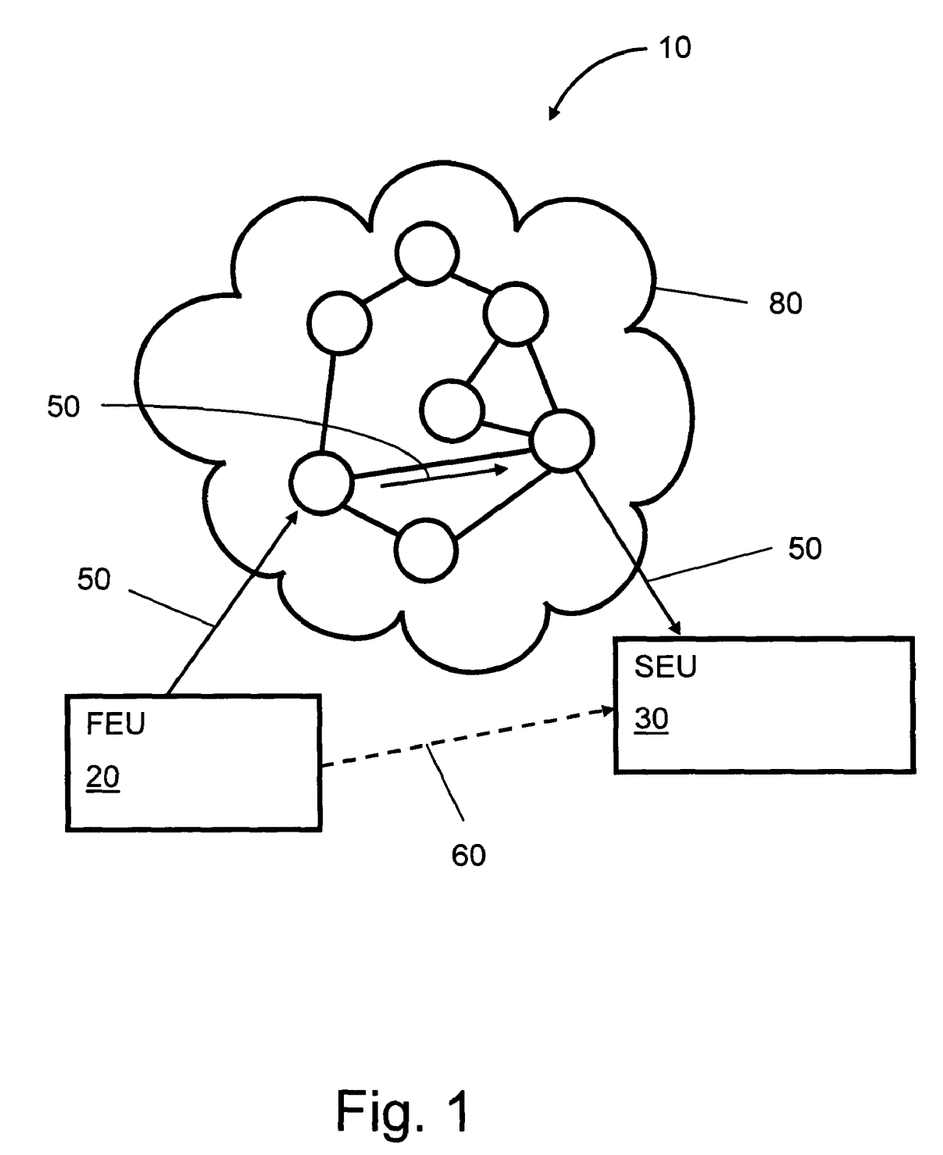
FIG. 1 is a schematic diagram of a telephone system according to the present invention.

When the peer-to-peer structure 80 is implemented in the manner of the aforementioned GI protocol, the end-users 20, 30 in FIG. 1 together with other end-users not shown, the central servers 100 and the peer-to-peer network 110 are effectively participating nodes. In such a configuration, each end-user advertises its presence to GI storage nodes by periodically sending thereto its information about its identity or Temporary Identification Number (TIN) when the system 10 is configured to accept such TIN's. When one or more end-users make GI queries, for example akin to telephone directory enquiries, the storage nodes are responsive to send such stored User Identity Certificates (UIC) or Temporary Identification Numbers (TIN) as data packets in response to such queries.

In the case of UIC's, corresponding data packets despatched by the GI storage nodes are received at end-users which sign off the data packets with their end-user private keys; one or more querying end-users are thereby capable of verifying authenticity of the data packets received thereat, for example in response to making an enquiry, using a corresponding public key. Such an arrangement is advantageous because it is substantially capable of guaranteeing that no-one is able to fake User Identity Certificate (UIC) end-user directory entries. The rationale of such an approach is that a participating node who owns a User Identity Certificate (UIC) is operable, for example when advertising its presence, to send its private-key-signed data packets corresponding to its UIC to one or more storage nodes and another participating node if required. The signed UIC received from one or more of the storage nodes and stored therein for subsequent release is verifiable at an enquiring participating node by using a corresponding public key. Such an arrangement is capable of circumventing tampering with UIC and even faked UIC's.

The system 10 is further provided with a free-trial facility, such a facility being of commercial advantage for purposes of attracting new end-users to the system 10. Preferably, such a free-trial facility pertains to $X_1$ free days or, alternatively or additionally, $X_2$ free calls. For such free-trial days or calls, the central servers 100 are required to provide explicit permission for each free call made. Preferably, all permissions given or requested are recorded in a database of the system 10, for example for heuristic fraud detection purposes as described later. If the end-user has already used up free days and/or free calls allocated thereto, permission is not granted from the central servers 100 and the end-user is subsequently requested to pay if it still desires to make calls within the system 10.

The system 10 is capable of being operated concurrently within, or in combination with, a conventional telephone system, for example a conventional telephone system capable of implementing the Internet.

The aforementioned free-trial permission scheme is intended by the inventors only to pertain to the system 10. For conventional paid subscription calls undertaken in connection with the system 10, a normal conventional subscription regime applies and per-call permissions are neither requested nor recorded. For PSTN calls, a free-trial scheme does not pertain although it is potentially capable of being provided in connection with the system 10.

For each free-call permission request received in the system 10, the central servers 100 are operable to record at least one of the following parameters with regard to a call:
(a) calling end-user's identity in the form of a username or Temporary Identification Number (TIN);
(b) calling end-user's computer identification (ID);
(c) calling end-user's Internet Protocol (IP) address;
(d) called end-user's identity in the form of a username or TIN;
(e) called end-user's computer ID;
(f) called end-user's IP address;
(g) time and date of the call;
(h) whether or not permission was granted for the call.

Thus, in the system 10, a "trial user" explicit status is not accommodated; preferably, there is merely a need for an end-user to make some free calls from a defined starting date D. Any end-user is entitled to make free calls if its first free calls were less than $X_1$ days ago (or the end-user has not yet exercised a free-call option within the system 10). Alternatively, the system 10 may be set up in such a way as to allow a free-trial period to consist of X number of free calls as opposed to X days.

Hacked version of system 10 software enables fraudulent end-users to omit free-trial permission asking and permission checking provisions employed within the system 10. However, on account of the system 10 implementing both calling end-user and called end-user permission checking, such hacking only enables fraudulent end-users to call other fraudulent end-users free of charge; in other words, pirated fraudulent end-user software is only capable of providing very limited benefit when employed on the system 10. In many cases, such limited fraudulent use of the system 10 can be accommodated without significant financial loss to the proprietor of the system 10.

The inventors have appreciated that a major opportunity of fraud exists in the system 10 when a hacker attempts to fake a username or computer ID and repetitively starts new free trials. Such a major opportunity of fraud requires the hacker to omit from system 10 compatible software all local shareware-type checks. In order to counteract such fraud, the central servers 100 are programmed to perform heuristic fraud detection to identify repetitive fraud patterns. For example, the central servers 100 are operable to detect a fraudulent end-user seeking free-call provisions Z times and then subsequently seeking with the same IP address and new computer ID for new free-call permission to call the same people. Since explicit permission for free calls in the system 10 is required from the central servers 100, there is considerable information available within the system 10 for input to such heuristics fraud detection software executing within the system 10. However, the inventors are aware that such heuristics fraud detection is unlikely to detect all cases of hacking occurring within the system 10.

It will be appreciated that embodiments of the invention described above are susceptible to being modified without departing from the scope of the invention.

In the foregoing, the system 10 is described as being able to support the use of Temporary Identification Numbers (TINs). However, the system 10 is capable of being modified so that TINs are not utilized therein, such that user names and associated User Identity Certificates (UIC's) with associated time-limited substantially cost-free privileges are employed for free-trial purposes. If required, the system 10 is even susceptible to being configured so that free-trial usage as described earlier is not provided to end-users; alternatively, other arrangements for free trials can be utilized, for example reimbursement of initial paid subscription fee.

The system 10 is preferably implemented, at least in part, using software executable on computing hardware. Such software can be distributed to users via a communication network such as the Internet and/or via the software stored on a suitable data carrier such as a CD ROM supplied to users.

In the foregoing description of embodiments of the invention relating to the telephone system 10, it will be appreciated that the invention is relevant to telecommunications systems in general and the term "telephone" should therefore be construed accordingly. Specifically, other forms of communication susceptible to being performed with the system include video calls, conference calls and text messaging.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention. In the foregoing, terms such as "contain", "include", "comprise", "have", "has", "is", "are", "incorporate" and "encompass" are intended to be construed as being non-exclusive, namely other items not disclosed are also potentially present.

The invention claimed is:

1. A peer-to-peer system, comprising:
a VoIP peer-to-peer system including:
a substantially de-centralized peer-to-peer communication structure interconnecting a plurality of authorized end-user devices to facilitate VoIP calls over a VoIP communication route, the plurality of authorized end-user devices including a calling authorized end-user device and a called authorized end-user device;
the peer-to-peer communication structure providing authorized end user identification by associating a respective username to each of the plurality of authorized end-user devices, where the username is useable as a telephone number in the peer-to-peer communication structure;
the peer-to-peer communication structure including an administration node that is configured to circumvent unauthorized and fraudulent use of the peer-to-peer communication structure by issuing an authorization certificate to each of the plurality of authorized end-user devices to facilitate proof of authorized access in the peer-to-peer communication structure;
the plurality of authorized end-user devices are configured to refuse to accept VoIP calls via the peer-to-peer communication structure where there exists an absence of proof of authorized access;
said calling authorized end-user device is configured to receive information regarding an address of said called authorized end-user device and verify, prior to commencing a VoIP call, an authorization certificate provided by said called authorized end-user device, such that verifying the authorization certificate enables access to the peer-to-peer communication structure to establish a call over the VoIP communication route to said called authorized end-user device; and
the calling authorized end-user device is configured to verify the authorization certificate from the called authorized end-user device to establish the VoIP call without needing to communicate with the administration node responsible for issuing the authorization certificate.

2. A peer-to-peer system according to claim 1, wherein the administration node is configured to generate one or more private-public key pairs, maintain said one or more private keys secret, and distribute said one or more corresponding public keys within the peer-to-peer communication structure for certificate authentication purposes.

3. A peer-to-peer system according to claim 2, wherein the administration node is configured to generate private-public key pairs using a Rivest-Shamir-Adelman (RSA) method.

4. A peer-to-peer system according to claim 1, wherein the administration node is configured to perform at least one of:
(a) providing an end-user accounts database;
(b) providing a synchronizing time reference for the peer-to-peer communication structure;
(c) providing globally-configurable settings for the peer-to-peer system;
(d) providing peer discovery during bootstrap of the peer-to-peer communication structure;
(e) handling new end-user registration; and
(f) monitoring operation of the peer-to-peer communication structure for controlling desired modes of operation thereof.

5. A peer-to-peer system according to claim 1, configured to operate concurrently with POTS and/or PSTN.

6. A peer-to-peer system according to claim 1, wherein the administration node is implemented by way of one or more computer servers.

7. A peer-to-peer system according to claim 1, wherein the administration node is configured to apply a heuristics fraud detection analysis of end-user registration and system usage data for detecting fraudulent access to the peer-to-peer communication structure by end-users.

8. A peer-to-peer system according to claim 1, wherein the communication route is for a call.

9. A peer-to-peer system according to claim 1, configured to perform at least one of the following functions:
(a) handling end-user preferences;
(b) providing end-user identification by way of one or more of the following: node identification (ID), username, and end-user profile data;
(c) maintaining basic statistics; and
(d) maintaining firewall and/or "Network Address Translation" (NAT) traversal via random peer nodes within the network functioning as ad hoc proxies supporting communication therethrough.

10. A peer-to-peer system according to claim 1, in which an end user identification in the form of a user name is used as a telephone number to establish a call through the peer-to-peer communication structure;
the call is one of a telephone call, a video call, and a conference call; and
the communication route is established for text messaging.

11. A method of establishing a call in a peer-to-peer communication structure, comprising:
managing access to a VoIP peer-to-peer system that includes:
a substantially de-centralized peer-to-peer communication structure interconnecting a plurality of authorized end-user devices to facilitate VoIP calls over a VoIP communication route, the plurality of authorized end-user devices including a calling authorized end-user device and a called authorized end-user device;
the peer-to-peer communication structure providing authorized end user identification by associating a respective username to each of the plurality of authorized end-user devices, where the username is useable as a telephone number in the peer-to-peer communication structure;
the peer-to-peer communication structure including an administration node that is configured to circumvent unauthorized and fraudulent use of the peer-to-peer communication structure by issuing an authorization certificate to each of the plurality of authorized end-user devices to facilitate proof of authorized access in the peer-to-peer communication structure; and
the plurality of authorized end-user devices are configured to refuse to accept VoIP calls via the peer-to-peer communication structure where there exists an absence of proof of authorized access;
receiving, at the calling authorized end-user device, at least one authorization certificate from the administration node;
receiving, at the calling authorized end-user device, information regarding the address of the called authorized end-user device;

verifying, at the calling authorized end-user device and prior to commencing a call, an authorization certificate provided by the called authorized end-user device, such that verifying the authorization certificate enables access to the VoIP peer-to-peer communication structure; and establishing, based on verifying the authorization certificate provided by the called authorized end-user device, the VoIP call over the VoIP communication route in the peer-to-peer communication structure to said called authorized end-user device.

12. A method according to claim 11, wherein the administration node is configured to generate one or more private-public key pairs, maintain said one or more private keys secret, and distribute said one or more corresponding public keys to authorized end-user devices for certificate authentication purposes.

13. A method according to claim 12, wherein the administration node is configured to generate private-public key pairs using a Rivest-Shamir-Adelman (RSA) method.

14. A method according to claim 11, wherein the administration node is configured to perform at least one of:
 (a) providing an end-user accounts database;
 (b) providing a synchronizing time reference for the peer-to-peer communication structure;
 (c) providing globally-configurable settings for the peer-to-peer communication structure;
 (d) providing peer discovery during bootstrap of the peer-to-peer communication structure;
 (e) handling new end-user registration; and
 (f) monitoring operation of the peer-to-peer communication structure for controlling desired modes of operation thereof.

15. A method according to claim 11, wherein the peer-to-peer communication structure is arranged to be configurable to operate concurrently with POTS and/or PSTN.

16. A method according to claim 11, wherein the administration node is implemented by way of one or more central computer servers.

17. A method according to claim 11, wherein the administration node is configured to apply an heuristics fraud detection analysis of end-user registration and system usage data for detecting fraudulent access to the peer-to-peer communication structure by end-users.

18. A computer program product, embodied on a non-transitory computer-readable storage medium, comprising computer code executed by at least one computer processor to establish a call in a VoIP peer-to-peer system by:
 facilitating VoIP communication in the VoIP peer-to-peer system, the VoIP peer-to-peer system including:
  a substantially de-centralized peer-to-peer communication structure interconnecting a plurality of authorized end-user devices to facilitate VoIP calls over a VoIP communication route, the plurality of authorized end-user devices including a calling authorized end-user device and a called authorized end-user device;
 the peer-to-peer communication structure providing authorized end user identification by associating a respective username to each of the plurality of authorized end-user devices, where the username is useable as a telephone number in the peer-to-peer communication structure;
 the peer-to-peer communication structure including and an administration node that is configured to circumvent unauthorized and fraudulent use of the peer-to-peer communication structure by issuing an authorization certificate to each of the plurality of authorized end-user devices to facilitate proof of authorized access in the peer-to-peer communication structure;
 the plurality of authorized end-user devices are configured to refuse to accept VoIP calls via the peer-to-peer communication structure where there exists an absence of proof of authorized access;
 said calling authorized end-user device is configured to receive information regarding an address of said called authorized end-user device and verify, prior to commencing a call, an authorization certificate provided by said called authorized end-user device, such that verifying the authorization certificate enables access to the peer-to-peer system to establish a call over a communication route to said called authorized end-user device; and
 the calling authorized end-user device is configured to verify the authorization certificate from the called authorized end-user device to establish the VoIP call without needing to communicate with the administration node responsible for issuing the authorization certificate.

19. A computer program product, embodied on a non-transitory computer-readable storage medium, comprising computer code executed by at least one computer processor to establish a VoIP call in a VoIP peer-to-peer system, the VoIP peer-to-peer system including:
 a substantially de-centralized peer-to-peer communication structure interconnecting a plurality of authorized end-user devices to facilitate VoIP calls over a VoIP communication route, the plurality of authorized end-user devices including calling authorized end-user device and a called authorized end-user device;
 the peer-to-peer communication structure providing authorized end user identification by associating a respective username to each of the plurality of authorized end-user devices, where the username is useable as a telephone number in the peer-to-peer communication structure;
 the peer-to-peer communication structure including and an administration node that is configured to circumvent unauthorized and fraudulent use of the peer-to-peer communication structure by issuing an authorization certificate to each of the plurality of authorized end-user devices to facilitate proof of authorized access in the peer-to-peer communication structure;
 the plurality of authorized end-user devices are configured to refuse to accept VoIP calls via the peer-to-peer communication structure where there exists an absence of proof of authorized access;
 the computer code executed by the at least one processor establishes the VoIP call in the VoIP peer-to-peer system by facilitating:
  receiving, at the calling authorized end-user device, at least one authorization certificate from an administration node;
  receiving, at the calling authorized end-user device, information regarding the address of the called authorized end-user device; and
  verifying, at the calling authorized end-user device and prior to commencing the VoIP call, an authorization certificate provided by the called authorized end-user device, such that verifying the authorization certificate enables access to the VoIP peer-to-peer system;
 where the calling authorized end-user device is configured to verify the authorization certificate from the called authorized end-user device to establish the VoIP call without needing to communicate with the administration node responsible for issuing the authorization certificate.

20. A peer-to-peer system, comprising:
a VoIP peer-to-peer system using a substantially de-centralized peer-to-peer communication structure configured to interconnect a plurality of authorized end-user devices to facilitate VoIP calls over a VoIP communication route, the plurality of authorized end-user devices including a calling authorized end-user device, and a called authorized end-user device;
the peer-to-peer communication structure is configured to facilitate authorized end user identification by associating a respective username to each of the plurality of authorized end-user devices, where the username is useable as a telephone number in the peer-to-peer communication structure;
the peer-to-peer communication structure is configured to include an administration node that is configured to circumvent unauthorized and fraudulent use of the peer-to-peer communication structure by issuing an authorization certificate to each of the plurality of authorized end-user devices to facilitate proof of authorized access in the peer-to-peer communication structure;
the plurality of authorized end-user devices configured to refuse to accept VoIP calls via the peer-to-peer communication structure where there exists an absence of proof of authorized access;
said calling authorized end-user device is configured to receive information regarding an address of said called authorized end-user device and verify, prior to commencing a call, an authorization certificate provided by said called authorized end-user device, such that verifying the authorization certificate enables access to the peer-to-peer communication structure to establish a VoIP call over the VoIP communication route to said called authorized end-user device; and
the calling authorized end-user device is configured to verify the authorization certificate from the called authorized end-user device to establish the VoIP call without needing to communicate with the administration node responsible for issuing the authorization certificate.

21. A peer-to-peer system according to claim 20, wherein the administration node is configured to generate one or more private-public key pairs, maintain said one or more private keys secret, and distribute said one or more corresponding public keys within the peer-to-peer communication structure for certificate authentication purposes.

22. A peer-to-peer system according to claim 21, wherein the administration node is configured to generate private-public key pairs using a Rivest-Shamir-Adelman (RSA) method.

23. A peer-to-peer system according to claim 20, wherein the administration node is configured to perform at least one of:
    (a) providing an end-user accounts database;
    (b) providing a synchronizing time reference for the peer-to-peer communication structure;
    (c) providing globally-configurable settings for the peer-to-peer system;
    (d) providing peer discovery during bootstrap of the peer-to-peer communication structure;
    (e) handling new end-user registration; and
    (f) monitoring operation of the peer-to-peer communication structure for controlling desired modes of operation thereof.

24. A peer-to-peer system according to claim 20, configured to operate concurrently with POTS and/or PSTN.

25. A peer-to-peer system according to claim 20, wherein the administration node is implemented by way of one or more computer servers.

26. A peer-to-peer system according to claim 20, wherein the administration node is configured to apply a heuristics fraud detection analysis of end-user registration and system usage data for detecting fraudulent access to the peer-to-peer communication structure by end-users.

27. A peer-to-peer system according to claim 20, wherein the communication route is for a call.

28. A peer-to-peer system according to claim 20, configured to perform at least one of the following functions:
    (a) handling end-user preferences;
    (b) providing end-user identification by way of one or more of the following: node identification (ID), username, and end-user profile data;
    (c) maintaining basic statistics; and
    (d) maintaining firewall and/or "Network Address Translation" (NAT) traversal via random peer nodes within the network functioning as ad hoc proxies supporting communication therethrough.

29. A peer-to-peer system according to claim 20, in which an end user identification in the form of a user name is used as a telephone number to establish a call through the peer-to-peer communication structure;
    the call is one of a telephone call, a video call, and a conference call; and
    the communication route is established for text messaging.

30. A computer program product, embodied on a non-transitory computer-readable storage medium, comprising computer code executed by at least one computer processor to establish a call in a VoIP peer-to-peer system by:
    managing VoIP communication in the VoIP peer-to-peer system with a calling authorized end-user device, a called authorized end-user device;
    the VoIP peer-to-peer system including:
    a substantially de-centralized peer-to-peer communication structure interconnecting a plurality of authorized end-user devices to facilitate VoIP calls over a VoIP communication route, the plurality of authorized end-user devices including the calling authorized end-user device and a called authorized end-user device;
    the peer-to-peer communication structure providing authorized end user identification by associating a respective username to each of the plurality of authorized end-user devices, where the username is useable as a telephone number in the peer-to-peer communication structure;
    the peer-to-peer communication structure including an administration node that is configured to circumvent unauthorized and fraudulent use of the peer-to-peer communication structure by issuing an authorization certificate to each of the plurality of authorized end-user devices to facilitate proof of authorized access in the peer-to-peer communication structure;
    the plurality of authorized end-user devices are configured to refuse to accept VoIP calls via the peer-to-peer communication structure where there exists an absence of proof of authorized access;
    said calling authorized end-user device is configured to receive information regarding an address of said called authorized end-user device and verify, prior to commencing a call, an authorization certificate provided by said called authorized end-user device, such that verifying the authorization certificate enables access to the peer-to-peer system to establish a call over the VoIP communication route to said called authorized end-user device; and the calling authorized end-user device is configured to verify the authorization certificate from the called authorized end-user device to establish the VoIP call without needing to communicate with the administration node responsible for issuing the authorization certificate.

31. A method of establishing a call in a peer-to-peer communication structure, comprising:

facilitating access to a VoIP peer-to-peer system that includes:

a substantially de-centralized peer-to-peer communication structure interconnecting a plurality of authorized end-user devices to facilitate VoIP calls over a VoIP communication route, the plurality of authorized end-user devices including a calling authorized end-user device and a called authorized end-user device;

the peer-to-peer communication structure providing authorized end user identification by associating a respective username to each of the plurality of authorized end-user devices, where the username is useable as a telephone number in the peer-to-peer communication structure;

the peer-to-peer communication structure including an administration node that is configured to circumvent unauthorized and fraudulent use of the peer-to-peer communication structure by issuing an authorization certificate to each of the plurality of authorized end-user devices to facilitate proof of authorized access in the peer-to-peer communication structure; and the plurality of authorized end-user devices are configured to refuse to accept VoIP calls via the peer-to-peer communication structure where there exists an absence of proof of authorized access;

receiving, at the calling authorized end-user device, at least one authorization certificate from the administration node;

receiving, at the calling authorized end-user device, information regarding the address of the called authorized end-user device;

verifying, at the calling authorized end-user device and prior to commencing a call, an authorization certificate provided by the called authorized end-user device, such that verifying the authorization certificate enables access to the VoIP peer-to-peer communication structure; and establishing, based on verifying the authorization certificate provided by the called authorized end-user device, the call over the VoIP communication route in the peer-to-peer communication structure to said called authorized end-user device;

where the calling authorized end-user device is configured to verify the authorization certificate from the called authorized end-user device to establish the VoIP call without needing to communicate with the administration node responsible for issuing the authorization certificate.

32. A method according to claim 31, wherein the administration node is configured to generate one or more private-public key pairs, maintain said one or more private keys secret, and distribute said one or more corresponding public keys to authorized end-user devices for certificate authentication purposes.

33. A method according to claim 32, wherein the administration node is configured to generate private-public key pairs using a Rivest-Shamir-Adelman (RSA) method.

34. A method according to claim 31, wherein the administration node is configured to perform at least one of:

(a) providing an end-user accounts database;

(b) providing a synchronizing time reference for the peer-to-peer communication structure;

(c) providing globally-configurable settings for the peer-to-peer communication structure;

(d) providing peer discovery during bootstrap of the peer-to-peer communication structure;

(e) handling new end-user registration; and (f) monitoring operation of the peer-to-peer communication structure for controlling desired modes of operation thereof.

35. A method according to claim 31, wherein the peer-to-peer communication structure is arranged to be configurable to operate concurrently with POTS and/or PSTN.

36. A method according to claim 31, wherein the administration node is implemented by way of one or more central computer servers.

37. A method according to claim 21, wherein the administration node is configured to apply an heuristics fraud detection analysis of end-user registration and system usage data for detecting fraudulent access to the peer-to-peer communication structure by end-users.

38. A computer program product, embodied on a non-transitory computer-readable storage medium, comprising computer code executed by at least one computer processor to establish a VoIP call in a VoIP peer-to-peer system including:

a substantially de-centralized peer-to-peer communication structure interconnecting a plurality of authorized end-user devices to facilitate VoIP calls over a VoIP communication route, the plurality of authorized end-user devices including calling authorized end-user device and a called authorized end-user device;

the peer-to-peer communication structure providing authorized end user identification by associating a respective username to each of the plurality of authorized end-user devices, where the username is useable as a telephone number in the peer-to-peer communication structure;

the peer-to-peer communication structure including and an administration node that is configured to circumvent unauthorized and fraudulent use of the peer-to-peer communication structure by issuing an authorization certificate to each of the plurality of authorized end-user devices to facilitate proof of authorized access in the peer-to-peer communication structure; and the plurality of authorized end-user devices are configured to refuse to accept VoIP calls via the peer-to-peer communication structure where there exists an absence of proof of authorized access;

the computer program product including computer code executed by the at least one processor for:

receiving, at the calling authorized end-user device, at least one authorization certificate from the administration node;

receiving, at the calling authorized end-user device, information regarding the address of the called end-user device;

verifying, at the calling end-user device and prior to commencing a call, an authorization certificate provided by the called authorized end-user device, such that verifying the authorization certificate enables access to the VoIP peer-to-peer system; and establishing, based on verifying the authorization certificate provided by the called end-user device, the VoIP call over the VoIP communication route in the peer-to-peer system to said called authorized end-user device;
where the calling authorized end-user device is configured to verify the authorization certificate from the called authorized end-user device to establish the VoIP call without needing to communicate with the administration node responsible for issuing the authorization certificate.

* * * * *